US009307030B2

(12) United States Patent
Shin et al.

(10) Patent No.: US 9,307,030 B2
(45) Date of Patent: Apr. 5, 2016

(54) ELECTRONIC APPARATUS, NETWORK SYSTEM AND METHOD FOR ESTABLISHING PRIVATE NETWORK

(71) Applicant: Samsung Electronics Co. Ltd., Suwon-si, Gyeonggi-do (KR)

(72) Inventors: Sang-ho Shin, Seoul (KR); Hong-uk Woo, Seoul (KR); Joong-hwan Lee, Suwon-si (KR); Myong-kyun Lim, Seoul (KR); Jin-hyeon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 13/919,309

(22) Filed: Jun. 17, 2013

(65) Prior Publication Data
US 2014/0115171 A1    Apr. 24, 2014

(30) Foreign Application Priority Data
Oct. 22, 2012  (KR) .................. 10-2012-0117185

(51) Int. Cl.
*G06F 15/16* (2006.01)
*H04L 29/08* (2006.01)
*H04L 29/06* (2006.01)

(52) U.S. Cl.
CPC ............ *H04L 67/141* (2013.01); *H04L 65/105* (2013.01); *H04L 67/28* (2013.01)

(58) Field of Classification Search
CPC ..... H04L 67/28; H04L 67/141; H04L 65/105; H04L 63/0281
USPC .............................................. 709/203, 227
See application file for complete search history.

(56) References Cited

U.S. PATENT DOCUMENTS

| | | | |
|---|---|---|---|
| 6,173,322 B1 * | 1/2001 | Hu ................................ 709/224 |
| 6,175,918 B1 * | 1/2001 | Shimizu ............................ 713/1 |
| 6,360,262 B1 * | 3/2002 | Guenthner et al. ........... 709/226 |
| 6,754,709 B1 * | 6/2004 | Gbadegesin ................... 709/227 |
| 7,685,035 B2 * | 3/2010 | Aoki ................................ 705/34 |
| 7,954,145 B2 | 5/2011 | Mohanty et al. |
| RE42,871 E | 10/2011 | Forslow |
| 8,260,873 B1 * | 9/2012 | Kandekar et al. ............. 709/209 |
| 8,688,776 B1 * | 4/2014 | Kolegayev et al. ........... 709/203 |
| 2002/0107922 A1 * | 8/2002 | Nakamura et al. ............ 709/205 |
| 2002/0138596 A1 * | 9/2002 | Darwin et al. ................ 709/220 |

(Continued)

FOREIGN PATENT DOCUMENTS

KR    10-2007-0097245 A    10/2007

*Primary Examiner* — Thu Ha Nguyen
(74) *Attorney, Agent, or Firm* — Jefferson IP Law, LLP (57) ABSTRACT

An electronic apparatus includes a communication unit connected to a first unit network and configured for communication with a plurality of unit networks comprising a plurality of clients, and a controller configured to control the electronic apparatus within the first unit network to operate in one of a proxy mode and a node mode if the plurality of clients form a private network, wherein the controller controls the electronic apparatus to directly communicate with a second unit network in the proxy mode, and controls the electronic apparatus to be connected to another client of the first unit network operating in the proxy mode and communicate with the second unit network through the other client in the node mode, and when the electronic apparatus operates in the node mode, the controller selectively changes the operational mode to the proxy mode depending on a private network service provided to the electronic apparatus.

18 Claims, 9 Drawing Sheets

(56) References Cited

U.S. PATENT DOCUMENTS

| | | | |
|---|---|---|---|
| 2003/0154306 A1* | 8/2003 | Perry | 709/245 |
| 2004/0249973 A1* | 12/2004 | Alkhatib et al. | 709/245 |
| 2006/0035657 A1* | 2/2006 | Lim | 455/518 |
| 2006/0053485 A1 | 3/2006 | Li | |
| 2006/0085545 A1* | 4/2006 | Borella et al. | 709/227 |
| 2006/0184998 A1 | 8/2006 | Smith et al. | |
| 2007/0016663 A1* | 1/2007 | Weis | 709/223 |
| 2007/0217407 A1* | 9/2007 | Yuan et al. | 370/389 |
| 2008/0229025 A1* | 9/2008 | Plamondon | 711/126 |
| 2009/0019108 A1* | 1/2009 | Ashok et al. | 709/203 |
| 2009/0083422 A1 | 3/2009 | McKay et al. | |
| 2009/0193135 A1* | 7/2009 | Prasad et al. | 709/231 |
| 2010/0034143 A1 | 2/2010 | Cordeiro et al. | |
| 2010/0061356 A1 | 3/2010 | Qvarfordt et al. | |
| 2010/0064151 A1* | 3/2010 | Saeki | 713/300 |
| 2010/0241694 A1* | 9/2010 | Jensen et al. | 709/203 |
| 2011/0138005 A1* | 6/2011 | Zhou et al. | 709/206 |
| 2011/0145325 A1* | 6/2011 | Hampel | 709/203 |
| 2011/0145341 A1* | 6/2011 | Hampel | 709/206 |
| 2011/0231910 A1 | 9/2011 | Mohanty et al. | |
| 2011/0238806 A1* | 9/2011 | Bhat et al. | 709/223 |
| 2012/0115542 A1* | 5/2012 | Griffin et al. | 455/552.1 |
| 2013/0201979 A1* | 8/2013 | Iyer et al. | 370/338 |
| 2013/0346610 A1* | 12/2013 | Liu | 709/225 |
| 2014/0082157 A1* | 3/2014 | Raber et al. | 709/220 |
| 2014/0280810 A1* | 9/2014 | Gabrielson et al. | 709/222 |
| 2014/0344468 A1* | 11/2014 | Saremi | 709/231 |
| 2014/0379853 A1* | 12/2014 | Shelton | 709/217 |
| 2015/0113045 A1* | 4/2015 | Tanaka et al. | 709/203 |

\* cited by examiner

ELECTRONIC APPARATUS, NETWORK SYSTEM AND METHOD FOR ESTABLISHING PRIVATE NETWORK

PRIORITY

This application claims the benefit under 35 U.S.C. §119(a) of a Korean patent application filed on Oct. 22, 2012 in the Korean Intellectual Property Office and assigned Serial No. 10-2012-0117185, the entire disclosure of which is hereby incorporated by reference.

BACKGROUND OF THE INVENTION

1. Field of the Invention

The present invention relates to an electronic apparatus as a client communicating by connecting to a server through a public network, a network system and a method for establishing a private network. More particularly, the present invention relates to an electronic apparatus, a network system and a method for establishing a private network to be provided with private network service by establishing the private network together with a plurality of clients separately from the public network.

2. Description of the Related Art

The term "electronic apparatus" refers to a device that may perform various functions as desired by a user by controlling the movement of electrons by energy such as electricity, etc. For example, home appliances such as a washing machine, a refrigerator, and a dishwasher, A/V devices such as a set-top box, an optical media player, a TV, a PC, mobile devices such as a mobile phone, and a portable media player, and other various types of devices are each considered an "electronic apparatus" that is provided to meet a user's needs.

In accordance with the development of technology and to meet a user's needs, such electronic apparatuses are being improved to perform various functions in addition to their original functions. For example, electronic apparatuses at a user's home may consist of a Local Area Network (LAN) within a limited range such as home network. Such LAN is connected to a public network through a gateway or router and the electronic apparatus communicates with various clients and is provided with various communication services.

However, depending on the type of service to be provided to the electronic apparatuses or on a service provider, the electronic apparatus may be required to be connected to a private network by a small number of clients. The private network is a type of a network enabling each client forming the network to directly transmit data/information therebetween.

Accordingly, there is a need for an electronic apparatus capable of installing and using various applications, a server, and a control method of a system for forming a private network for a small number of clients.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an electronic apparatus capable of installing and using various applications, a server, and a control method of a system.

In accordance with an aspect of the present invention, an electronic apparatus is provided. The electronic apparatus includes a communication unit connected to a first unit network and configured for communication with a plurality of unit networks including a plurality of clients, and a controller configured to control the electronic apparatus within the first unit network to operate in one of a proxy mode and a node mode if the plurality of clients forms a private network to enable direct communication among the plurality of clients, wherein the controller controls the electronic apparatus to directly communicate with a second unit network of the plurality of unit networks in the proxy mode, and controls the electronic apparatus to be connected to another client of the first unit network operating in the proxy mode and communicate with the second unit network through the other client in the node mode, and when the electronic apparatus operates in the node mode, the controller selectively changes the operational mode to the proxy mode depending on a private network service provided to the electronic apparatus.

If the operational mode is changed to the proxy mode, the controller may directly communicate with the second unit network rather than via the other client of the first unit network operating in the proxy mode.

The communication unit may be capable of being connected to a server controlling the clients to maintain direct communication among the clients forming the private network, the controller may be connected to the server when the formation of the private network is commenced, and the controller may maintain connection to the server to enable the direct communication if the proxy mode is selected and may disconnect from the server if the node mode is selected.

The controller may reconnect to the server when the operational mode is changed from the node mode to the proxy mode.

The respective clients forming the private network may directly exchange data rather than via the server, and the private network service which is provided to the electronic apparatus may include at least one of an operation of providing the data by another client to the electronic apparatus through the private network and an operation of providing the data by the electronic apparatus to the other client through the private network.

The private network service may include at least one of a private streaming service, a private live casting and a secured chat service.

The controller may change the operational mode to the proxy mode if it is determined that a communication traffic is at a preset level or higher according to the private network service while operating in the node mode.

The first unit network may be formed by the plurality of clients and the electronic apparatus is provided within an available communication range in which the clients and electronic apparatus communicate by at least one of an access point, a gateway and a router.

The controller may change the operational mode to the proxy mode if the electronic apparatus is out of the available communication range of the first unit network while operating in the node mode.

The controller may return to the node mode if the electronic apparatus which has been out of the available communication range of the first unit network is within the available communication range again.

In accordance with another aspect of the present invention, a network system is provided. The network system includes a plurality of clients configured to form a plurality of unit groups, a server configured to control clients forming a private network to directly communicate thereamong if the plurality of clients forms the private network, wherein the first client of a first unit group of the plurality of unit groups operates in a proxy mode to directly communicate with a second unit group of the plurality of unit groups, and a second client of the first unit group is individually connected to the first client operating in the proxy mode and operates in a node mode to communicate with the second unit group through the first client, and the second client selectively changes an operational mode from the node mode to the proxy mode depending on a private network service provided to the second client.

If the operational mode is changed to the proxy mode, the second client may directly communicate with the second unit network rather than via the first client.

The first client may maintain connection to the server to perform the direct communication while operating in the proxy mode, and the second client may disconnect from the server while operating in the node mode.

The second client may reconnect to the server when the operational mode is changed from the node mode to the proxy mode.

The respective clients forming the private network may directly exchange data rather than via the server, and the private network service may include direct exchange of data among the plurality of clients through the private network.

The private network service may include at least one of a private streaming service, a private live casting and a secured chat service.

The second client may change the operational mode to the proxy mode if it is determined that a communication traffic is at a preset level or higher according to the private network service while operating in the node mode.

The plurality of clients of the first unit network may be provided within an available communication range in which the clients communicate with at least one of an access point, a gateway and a router.

The second client may change the operational mode to the proxy mode if the second client is out of the available communication range of the first unit network while operating in the node mode.

The second client may return to the node mode if the second client which has been out of the available communication range of the first unit network is within the available communication range again.

In accordance with another aspect of the present invention, a method for establishing a private network by a plurality of clients forming a plurality of unit groups is provided. The method includes selecting a proxy client from the plurality of clients of a first unit group which operates in a proxy mode to directly communicate with a second group of the plurality of unit groups, classifying the remaining clients of the first unit group as node clients which are individually connected to the proxy client and communicate with the second unit group through the proxy client, establishing the private network by the proxy client and node clients of the plurality of unit groups, and changing an operational mode of the node clients from the node mode to the proxy mode depending on a private network service provided to the node clients through the private network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
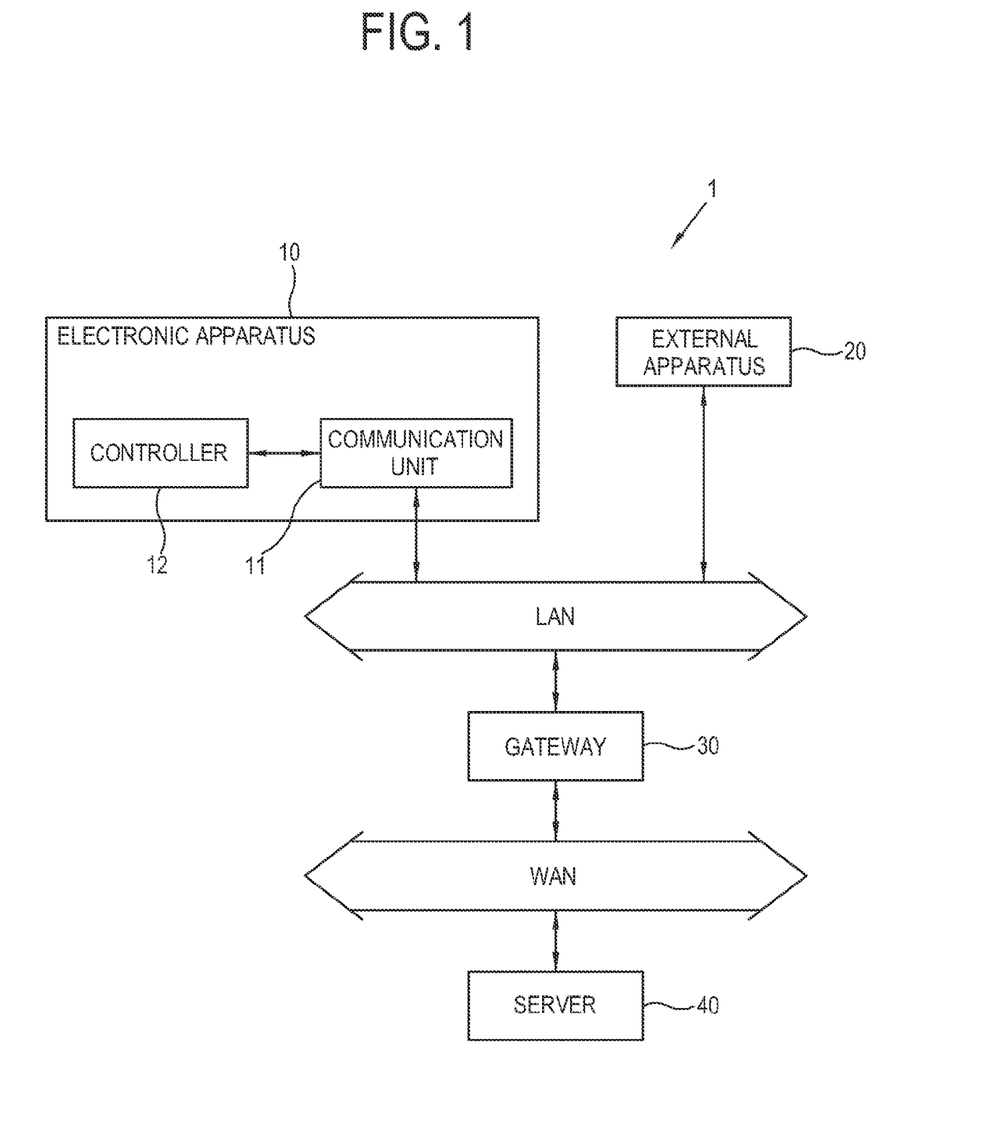
FIG. 1 illustrates a local area network system according to a first exemplary embodiment present invention.

FIG. 1 illustrates a Local Area Network (LAN) system according to a first exemplary embodiment of the present invention.

Referring to FIG. 1, the LAN system 1 includes one or more electronic apparatuses 10 and 20 which form a LAN, and a gateway 30 which connects the electronic apparatuses 10 and 20 to a Wide Area Network (WAN) for communication.

The electronic apparatuses 10 and 20 may be implemented as typical electronic apparatuses such as home appliances including a washing machine, a refrigerator, a dishwasher, etc., A/V devices including a set-top box, an optical media player, a TV, and a PC, mobile devices including a mobile phone and a portable media player, and the like. That is, the term "electronic apparatus" is not limited in type or nature.

The electronic apparatus 10 includes a communication unit 11, which is connected to the gateway 30 for communication, and a controller 12, which controls overall operations of the electronic apparatus 10.

The communication unit 11 enables the electronic apparatus 10 to communicate with an external apparatus 20 connected to the LAN, or with various clients or servers connected to the WAN. The communication unit 11 is connected to the gateway 30 according to a wired or a wireless communication protocol. If the communication unit 11 communicates according to the wireless protocol, it may be connected to the gateway 30 through an access point (not shown).

While the communication unit 11 is connected to the gateway 30, the controller 12 processes data transmitted through the communication unit 11, or transmits the data of the electronic apparatus 10 to the LAN or WAN. As the electronic apparatus 10 may be provided with various services through the foregoing communication network, the controller 12 processes the service-related data to provide a user of the electronic apparatus 10 with the service.

The gateway 30 connects the LAN, to which the electronic apparatus 10 is connected, to the WAN, to which various other LANs are connected. A network communicates according to a pre-agreed protocol, and networks may have different protocols. Thus, the gateway 30 coordinates communication among networks which have different protocols.

The gateway 30 may be deemed similar to a router. The router searches an optimal network route as well as transmits data packets to another network. The router is similar to the gateway 30 as it connects a plurality of different networks.

In such a network, a case in which the electronic apparatus 10 is implemented as a display apparatus and is provided with a video streaming service will be considered. A server 40, which provides the video streaming service, checks the gateway 30 to which the electronic apparatus 10 is connected if a communication address of the electronic apparatus 10 receiving the service is confirmed. The server 40 transmits the video stream to the gateway 30 through the WAN.

Upon receiving the video stream from the server 40, the gateway 30 specifies a subject to which the video stream is to be transmitted. The gateway 30 transmits the video stream to the electronic apparatus 10, and the controller 12 processes the video stream that is transmitted in real time by the gateway 30 to the communication unit 30 to display an image.

The foregoing exemplary embodiment shows an example of providing a public network service to the electronic apparatus 10. The foregoing network is a public network in which unspecified multiple clients 10 and 20 may be connected to the server 40. A service provided by the server 40 to the client 10 through the public network is called public network service.

In the public network, a private network may also be established by a plurality of clients. The private network is established by connecting a limited number of clients for direct communication thereamong in the public network. The private network is established to provide a private network service to clients forming the private network.

The private network service is service through which a predetermined first client forming the private network directly provides various data to one or more second clients. For example, the private network service may include a private streaming service through which the first client streams video to the second client, a private live casting through which the first client broadcasts an image produced by the first client to the second client, and secured chat services in which the first and second clients chat at a higher security level than the public network.

The foregoing services may not be suitable to be provided in the public network due to their nature. Accordingly, when a limited number of clients form the private network, each client may provide, or may be provided with, the foregoing services.

Figure 2:
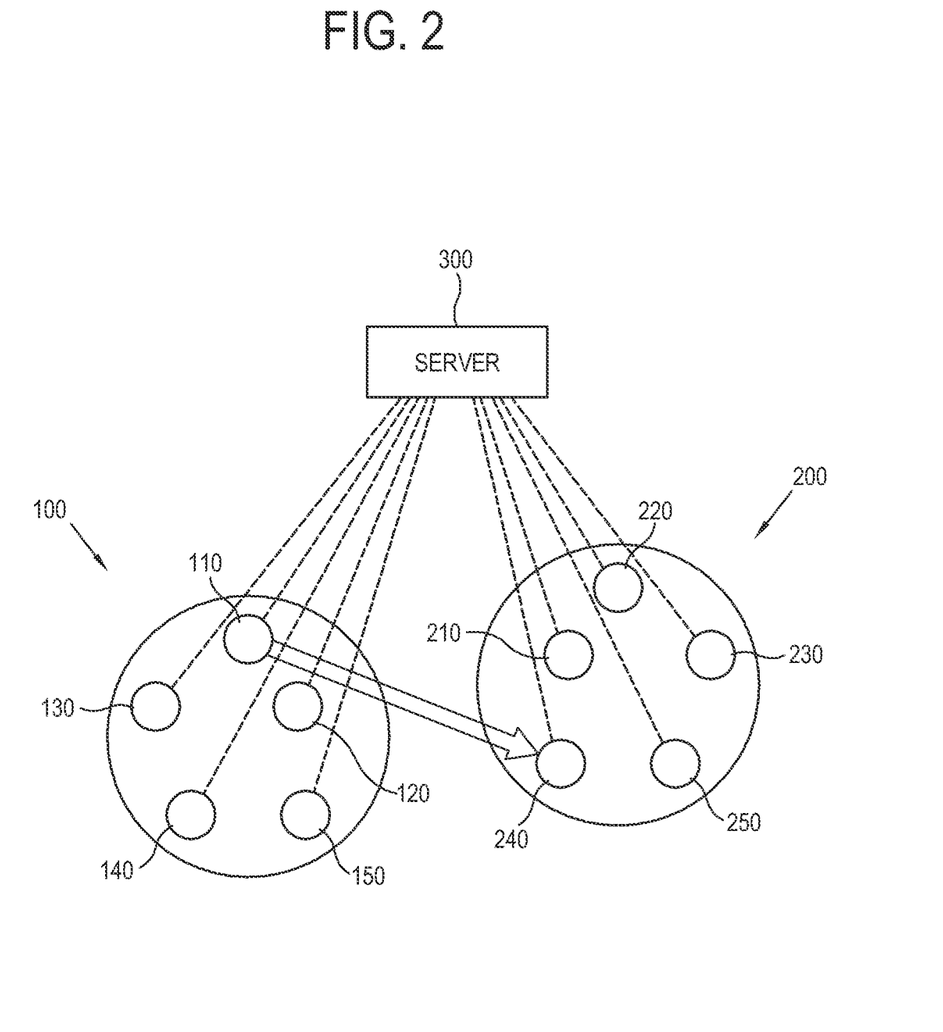
FIG. 2 illustrates a method for establishing a private network according to an exemplary embodiment of the present invention.

FIG. 2 illustrates an example of a basic method for establishing a private network according to an exemplary embodiment of the present invention.

Referring to FIG. 2, two LANs 100 and 200 are connected for communication in the public network. The respective LANs 100 and 200 include a plurality of clients 110, 120, 130, 140, and 150 and 210, 220, 230, 240, and 250, implemented as various types of electronic apparatus, and a gateway (not shown). Hereinafter, the two LANs 100 and 200 will be named as a first unit group 100 and a second unit group 200, respectively.

With the foregoing configuration, the private network may be established by a total of ten clients 110 to 150 and 210 to 250 of the first and second unit groups 100 and 200. The respective clients 110 to 150 and 210 to 250 in the private network directly communicate therewith and directly exchange data/information. That is, the respective clients 110 to 150 and 210 to 250 in the private network are connected in Peer-to-Peer (P2P) for communication.

To do so, a server 300 is required to control the respective clients 110 to 150 and 210 to 250 to enable direct communication among the clients 110 to 150 and 210 to 250.

The server 300 only controls the clients 110 to 150 and 210 to 250 to maintain the private network, but does not relay data/information. For example, a case in which data is transmitted by a client 110 of the first unit group 100 to another client 240 of the second unit group 200 in the private network may be considered.

In the foregoing case, even though the server 300 is connected to the clients 110 and 240, the data transmitted by the client 110 to the client 240 does not pass through the server 300. Rather, the data is directly transmitted by the client 110 to the client 240. That is, the connection of the server 300 to the clients 110 and 240 is only to enable direct communication between the clients 110 and 240.

FIG. 2 illustrates that data are transmitted only between the two clients 110 and 240. However, as all of clients 110 to 150 and 210 to 250 in the private network are connected to and controlled by the server 300, all of clients 110 to 150 and 210 to 250 are connected for direct communication even though such connection is not shown in FIG. 2.

However, such a private network increases a load on the server 300 as all of clients 110 to 150 and 210 to 250 remain connected to the server 300 and thus the server 300 controls the clients 110 to 150 and 210 to 250.

Accordingly, in the present exemplary embodiment, the foregoing structure may be adjusted as described below.

Figure 3:
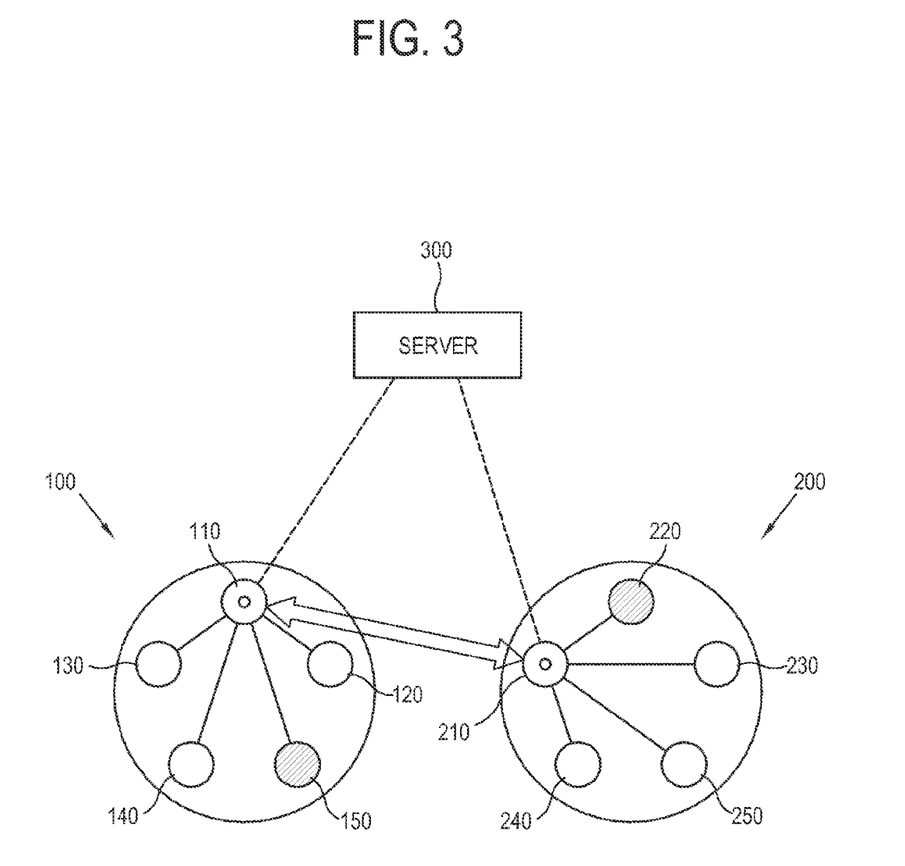
FIG. 3 illustrates a private network utilizing a proxy structure to each unit group according to an exemplary embodiment of the present invention.

FIG. 3 illustrates a private network utilizing a proxy structure to each unit group according to an exemplary embodiment of the present invention.

Referring to FIG. 3, a client 110 is selected from five clients 110 to 150 belonging to the first unit group 100 according to a preset algorithm.

The subject which selects the client 110 within the first unit group 100 may be the server 300 or one of the clients 110 to 150 in the first unit group 100. The algorithm for selecting the client 110 from the first unit group 100 may be determined by various methods. For example, the client 110 which uses the network most frequently, has the highest communication traffic, and the like may be selected.

If the client 110 is selected from the first unit group 100, it becomes a proxy client 110 which operates in a proxy mode. The remaining clients 120 to 150 within the first unit group 100 become node clients 120 to 150 which operate in a node mode.

All of clients 110 to 150 may selectively operate in either the proxy mode or the node mode. If the client 110 operates in the proxy mode, it is connected to the server 300 and is set to perform direct communication with the second unit group 200 by a control of the server 300. If the clients 120 to 150 operate in the node mode, they are individually connected to the proxy client 110 operating in the proxy mode rather than to the server 300, and communicate with the second unit group 200 through the proxy client 110.

That is, among the clients 110 to 150 of the first unit group 100, the proxy client 110 represents the first unit group 100 with respect to the other unit group 200. The node clients 120 to 150 may not individually communicate with the clients 210 to 250 of the other unit group 200, but may communicate through the proxy client 110.

The proxy client 110 should be controlled by the server 300 as it should perform direct communication with the other unit group 200. Thus, the proxy client 110 maintains its connection to the server 300 while it operates in the proxy mode. The node clients 120 to 150 are connected to the proxy client 110 to form the private network, and thus are disconnected from the server 300 while they operate in the node mode.

With the foregoing exemplary configuration, an example of data transmission will be explained. If a node client 150 of the first unit group 100 intends to transmit data to another node client 220 of the second unit group 200, the data transmitted by the node client 150 is transmitted to the proxy client 110 of the first unit group 100. The node client 220 which will receive the data is not connected to the proxy client 110 but is connected to the proxy client 210 of the second unit group 200. Accordingly, the proxy client 110 transmits the data to the proxy client 210 of the second unit group 200. The proxy client 210 then transmits the data to the node client 220 which was the original reception client.

However, the foregoing structure may experience certain problems.

Of various private network services, a particular type of service such as private streaming service or private live casting may deteriorate service quality due to the proxy clients 110 and 210.

For example, data which is streamed by the node client 150 should pass through two proxy clients 110 and 210, and a bottleneck problem may occur with respect to communication bandwidth. The private streaming service should process streamed data in real-time to display an image, and upon delay in receiving the data, the image is not displayed normally. That is, such service may not be provided normally if a communication traffic level is high in the private network.

Thus, in the present exemplary embodiment, the foregoing problems are addressed.

Figure 4:
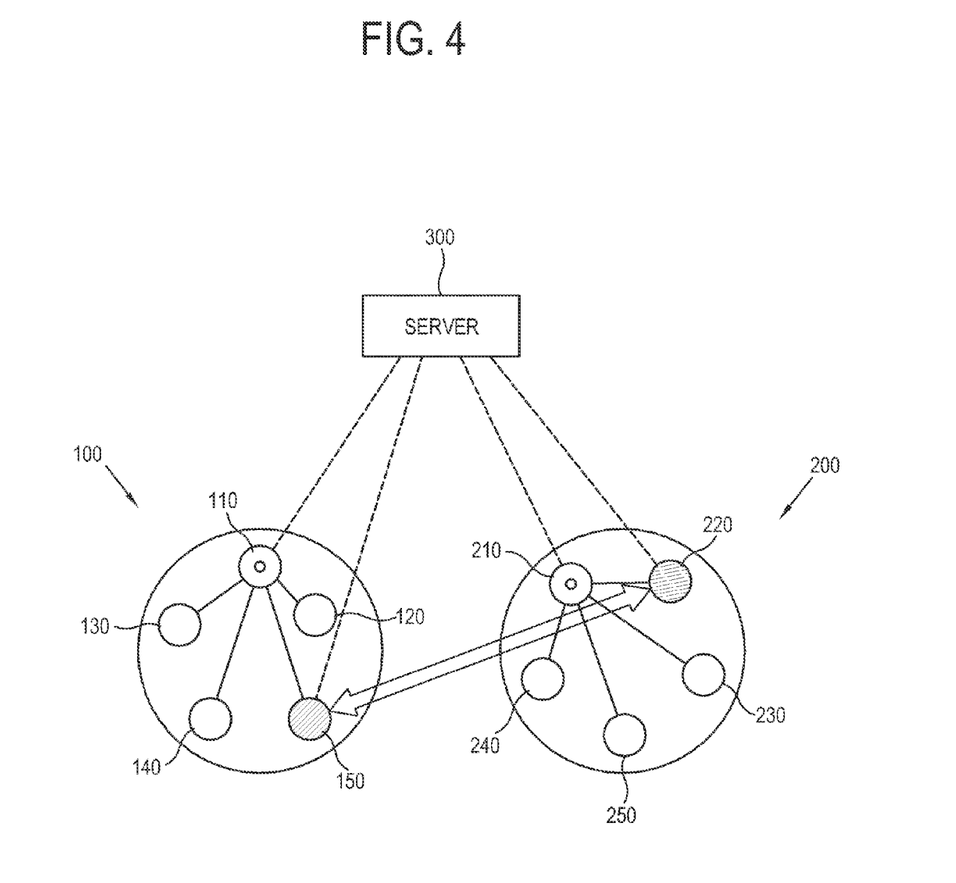
FIG. 4 illustrates changing an operational mode of a particular node client depending on a private network service according to a second exemplary embodiment of the present invention.

FIG. 4 illustrates changing an operational mode of a particular node client depending on a private network service according to a second exemplary embodiment of the present invention. In the present exemplary embodiment, the private network in FIG. 3 is in an initial state.

Referring to FIG. 4, the node client 150 of the first unit group 100 provides the node client 220 of the second unit group 200 with a private network service such as a private streaming service or a private live casting. As in FIG. 3, the node client 150 transmits the data/information relating to the private network service to the node client 220 via the proxy client 110 of the first unit group 100 and the proxy client 210 of the second unit group 200.

The node clients 150 and 220, which are engaged in the private network service, change the operational mode either automatically at the time when the private network service is commenced, or when it is determined that the communication traffic is at a preset level or higher depending on the service while the private network service is performed.

Referring to FIG. 4, the clients 150 and 220 in the private network may be engaged in the particular type of private network service such as a private streaming service or a private live casting or determine that the communication traffic in the private network is excessive at a predetermined time while they operate in the node mode.

In either case, the clients 150 and 220 change the operational mode from the node mode to the proxy mode. As the operational mode is changed to the proxy mode, the clients 150 and 220 are connected to the server 300 and may be directly connected therebetween.

The clients 150 and 220, which changed their operational mode to the proxy mode, may provide, or may be provided with, private network service directly rather than via the existing proxy clients 110 and 210 as the clients 150 and 220 may be directly connected therebetween.

As an example of the private streaming service, as the client 150 transmits data directly to the client 220 rather than via the proxy clients 110 and 210, a more stable streaming service may be provided to the client 220.

Figure 5:
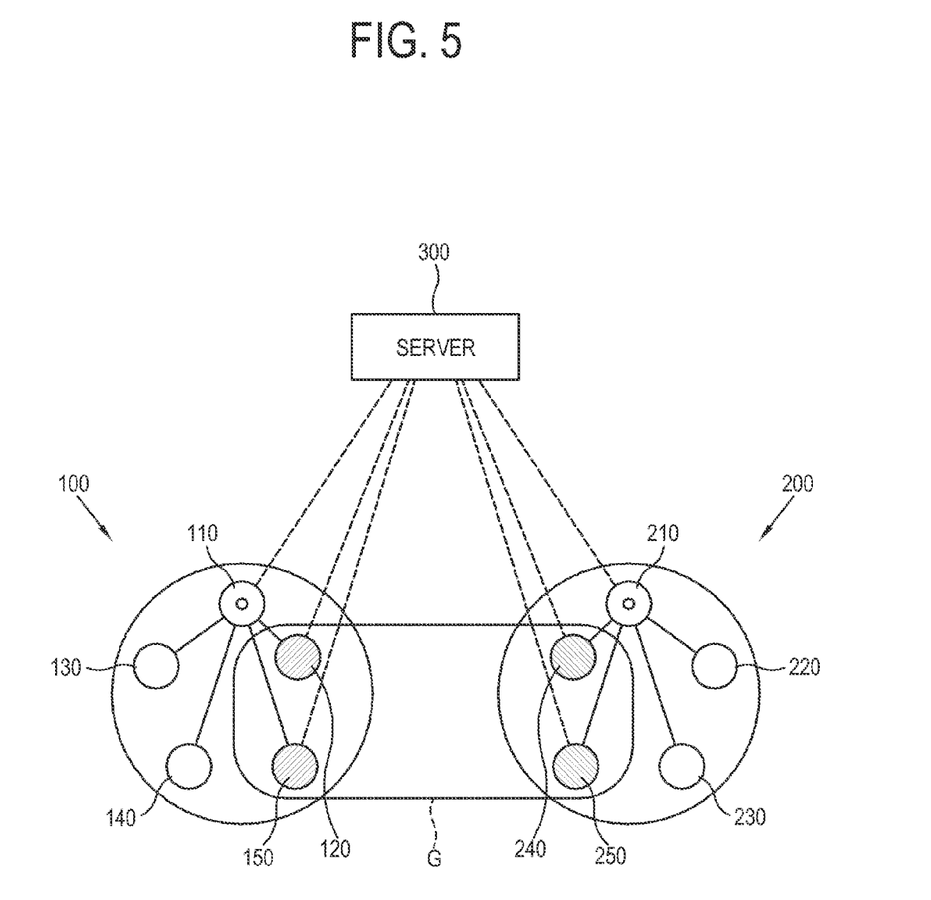
FIG. 5 illustrates changing an operational mode of a particular node client depending on a private network service according to a third exemplary embodiment of the present invention.

FIG. 5 illustrates changing an operational mode of a particular node client depending on a private network service according to a third exemplary embodiment of the present invention. In the present exemplary embodiment, the private network in FIG. 3 is in the initial state.

Referring to FIG. 5, a case in which a secured group chat service is provided to a total of four clients 120, 150, 240 and 250 including two clients 120 and 150 of the first unit group 100 and two clients 240 and 250 of the second unit group 200 will be considered. In this case, the secured group chat service should be provided within the client group with a higher security level than in the private network.

Accordingly, the clients 120, 150, 240 and 250, which are engaged in the secured group chat service, operate in the proxy mode and communicate therewith by using a higher security protocol.

As shown therein, the clients 120, 150, 240 and 250 change the operational mode from the node mode to the proxy mode at the time when they are engaged in the secured group chat service. The respective clients 120, 150, 240 and 250 are connected to the server 300 to enable direct communication thereamong.

The respective clients 120, 150, 240 and 250 form an additional private network group G for the secured group chat service. The clients 120, 150, 240 and 250 within the group G perform direct communication thereamong and may be provided with more secured service.

In performing the direct communication, the clients 120, 150, 240 and 250 within the group G may employ a different security protocol from those of clients 110, 130, 140, 210, 220 and 230 which do not belong to the group G.

Figure 6:
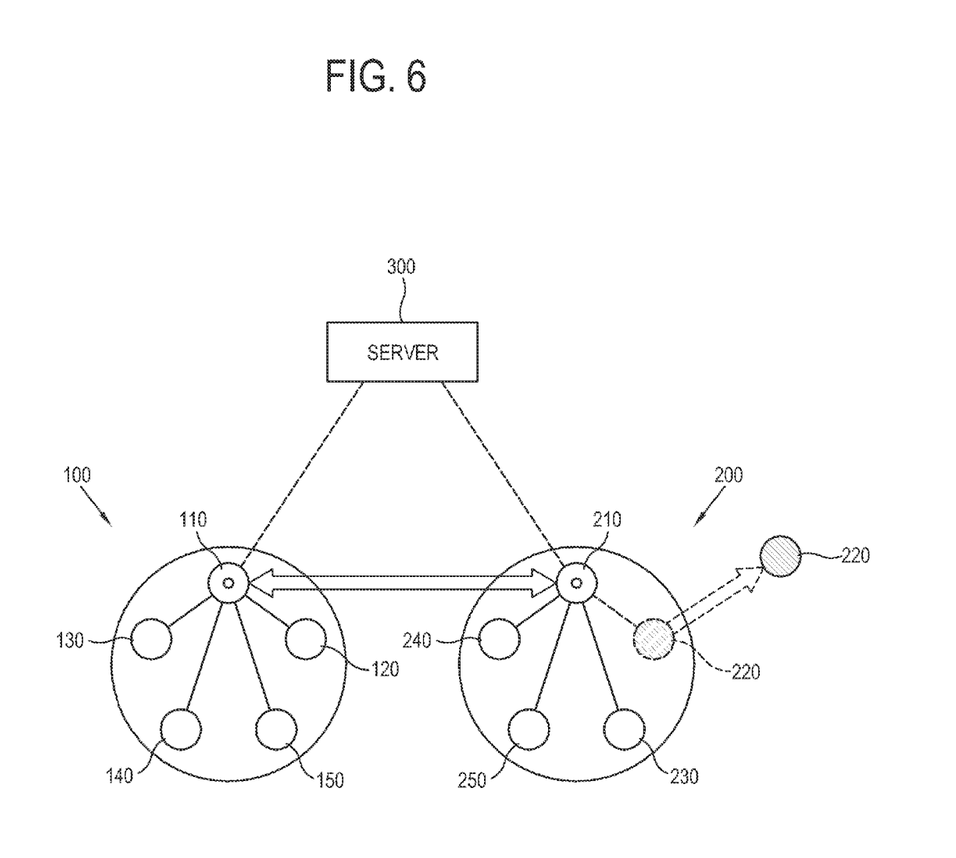
FIGS. 6 and 7 illustrate changing an operational mode of a particular node client depending on a private network service according to a fourth exemplary embodiment of the present invention.
Figure 7:
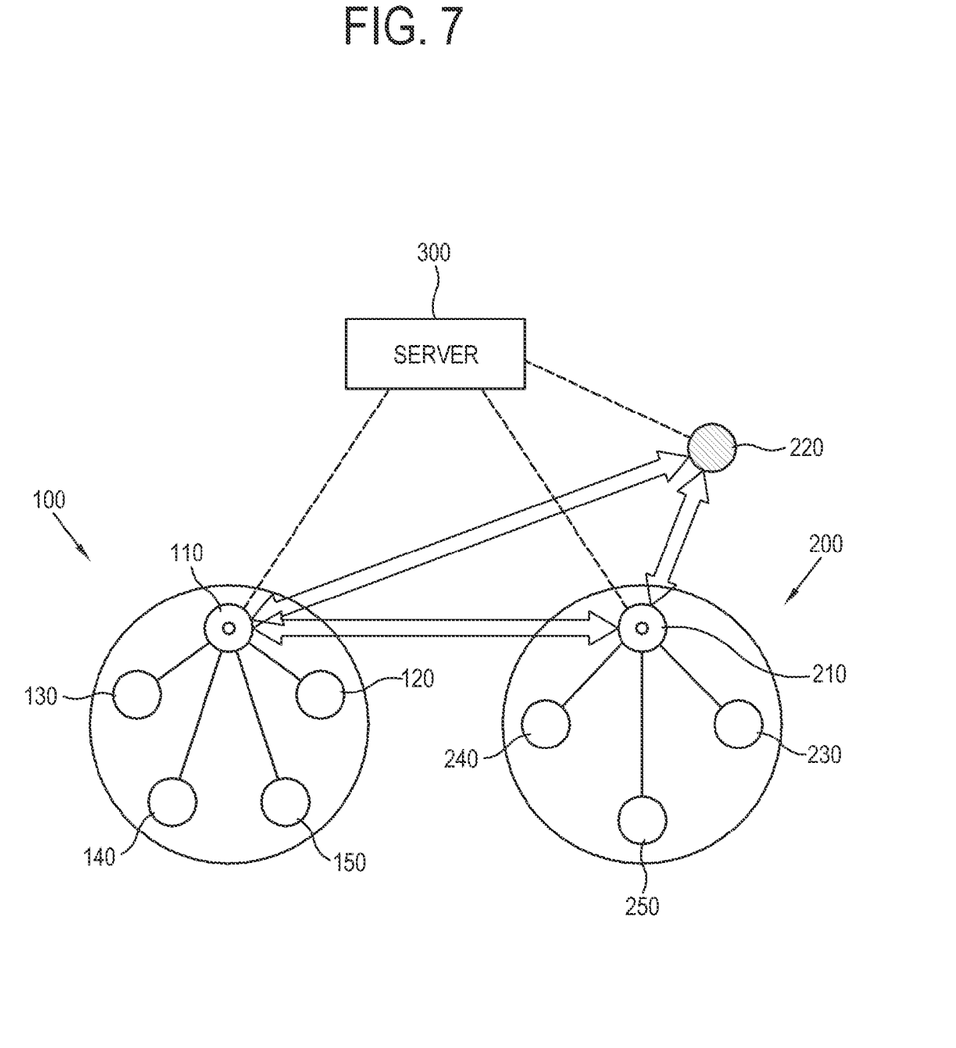

FIGS. 6 and 7 illustrate changing an operational mode of a particular node client depending on a private network service according to a fourth exemplary embodiment of the present invention. In the present exemplary embodiment, the private network as in FIG. 3 is in the initial state.

Referring to FIG. 6, the client 220, which operates in the node mode within the second unit group 200, is connected to the proxy client 210 to form the private network. However, if the client 220 is implemented as a mobile device, the client 220 may be out of an available communication range of the second unit group 200.

The available communication range of the second unit group 200 is a range in which the clients 220, 230, 240 and 250 of the second unit group 200 are connected to the proxy client 210 and form the private network. Such available communication range may be determined to be a range in which a communication connection is available to a gateway (not shown) or a router (not shown) or a range in which connection to an access point (not shown) for wireless communication is available.

If a client 220 is out of the available communication range, it may not be connected to the proxy client 210 for communication. That is, the client 220 may not be included in the private network.

The present exemplary embodiment addresses such a problem as described below.

Referring to FIG. 7, the client 220 which is out of the available communication range of the second unit group 200 changes its operational mode from the node mode to the proxy mode. The client 220 which has changed the operational mode to the proxy mode is connected to the server 300 and directly communicates with the existing proxy clients 110 and 210.

Then, the client 220 may be within the private network even if it is out of the available communication range.

If the client 220 returns to the available communication range, it may change its operational mode from the proxy mode to the node mode and is connected to the proxy client 210 again.

Hereinafter, a control method of an electronic apparatus according to a fifth exemplary embodiment will be described with reference to FIGS. 8 and 9.

Figure 8:
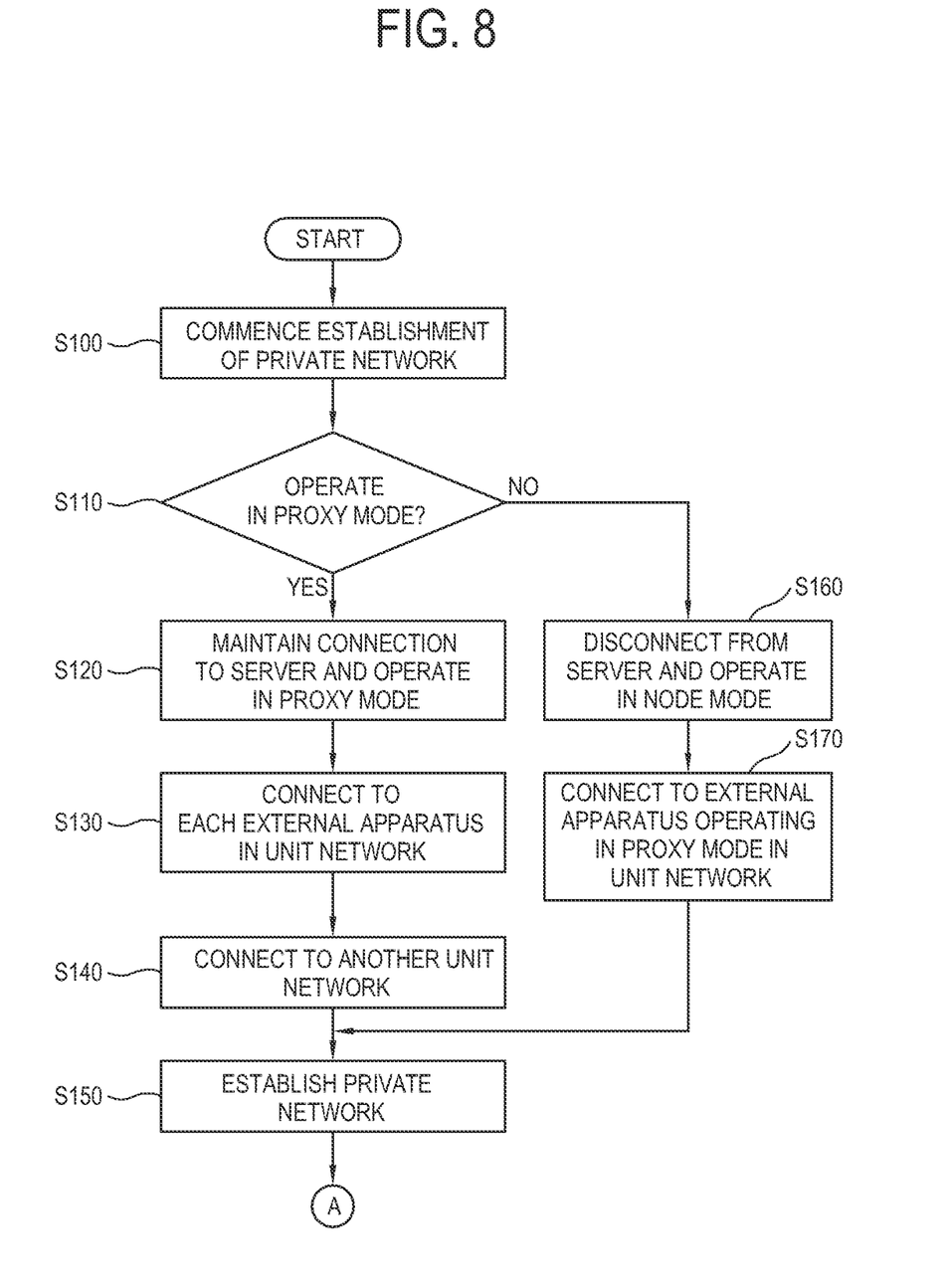
FIGS. 8 and 9 are control flowcharts showing a control method of an electronic apparatus according to a fifth exemplary embodiment of the present invention.
Figure 9:
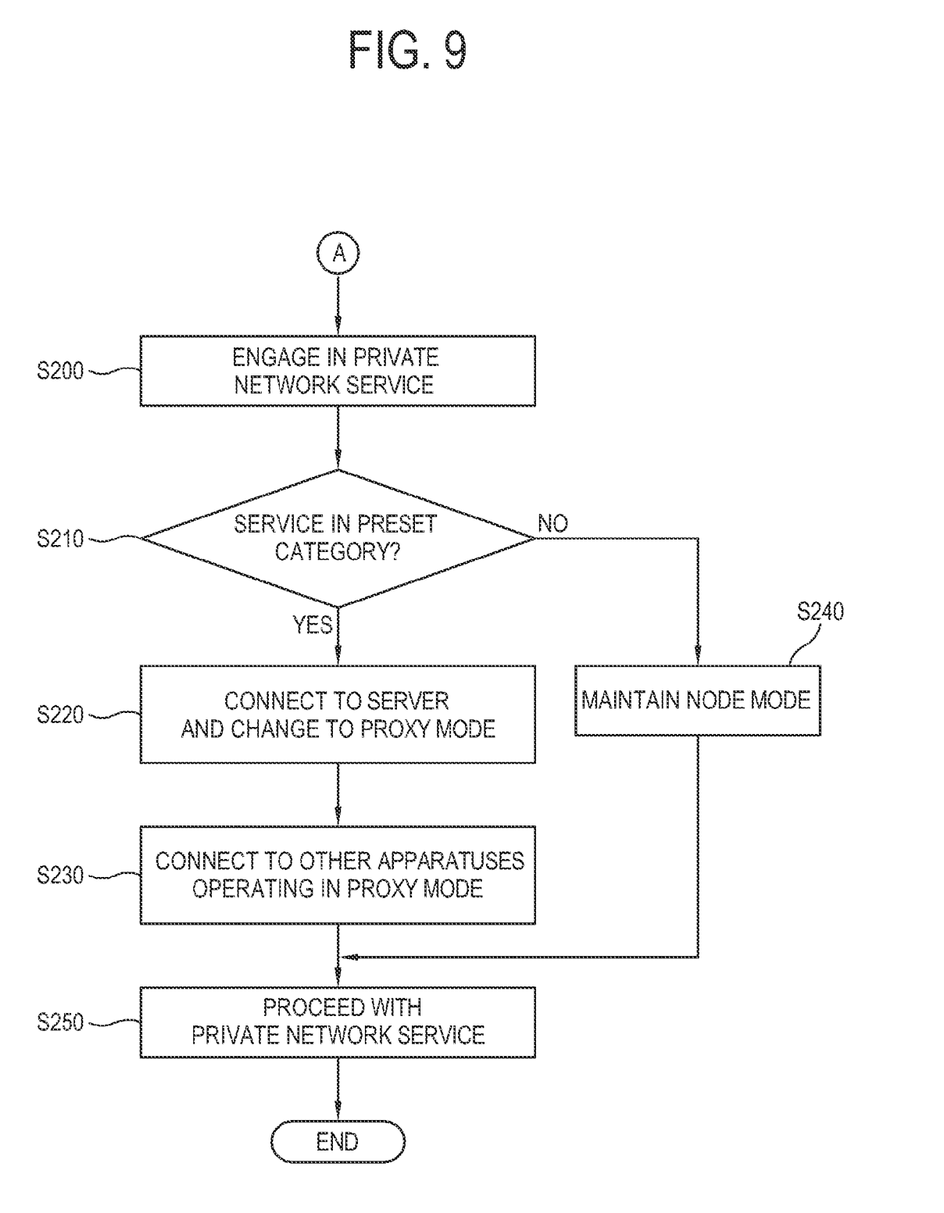

FIGS. 8 and 9 are control flowcharts showing a control method of an electronic apparatus according to a fifth exemplary embodiment of the present invention. The electronic apparatus and an external apparatus according to the present exemplary embodiment correspond to the clients 110 to 150 and 210 to 250 according to the foregoing exemplary embodiments, and the server according to the present exemplary embodiment corresponds to the server 300 according to the foregoing exemplary embodiments.

Referring to FIG. 8, the private network is established in step S100. The electronic apparatus determines whether to operate in the proxy mode or node mode in step S110. The determination of the mode is made by at least one of the server, the electronic apparatus and an external apparatus. If the determination is made by the server or external apparatus, the result of determining the mode may be informed by the server.

If the operational mode is determined as the proxy mode, the electronic apparatus maintains its connection to the server and operates in the proxy mode in step S120. The electronic apparatus is individually connected to each external apparatus within the unit network in step S130, and is connected to another unit network in step S140.

If the operational mode is determined as the node mode, the electronic apparatus is disconnected from the server and operates in the node mode in step S160. The electronic apparatus is connected to the external apparatus operating in the proxy mode within the unit network in step S170.

Then, the private network is established in step S150.

Hereinafter, an exemplary case in which the electronic apparatus operating in the node mode in FIG. 8 is in the initial state in FIG. 9 will be explained.

Referring to FIG. 9, the electronic apparatus is engaged in the private network service in step S200. The electronic apparatus determines whether the service is included in a preset category such as a private streaming service, a private live casting, a secured chat service, and the like in step S210.

If it is determined that the service is included in the category, the electronic apparatus is connected to the server and changes the operational mode from the node mode to the proxy mode in step S220. The electronic apparatus is directly connected to other devices operating in the proxy mode and forms the private network in step S230.

If it is determined that the service is not included in the category, the electronic apparatus maintains the node mode in step S240.

In the foregoing network, the electronic apparatus is engaged in the performance of the service in step S250.

The foregoing exemplary embodiments have explained the server 300 which controls the respective clients to enable direct communication among the clients. The server 300 only controls the clients to maintain the private network but does not relay data/information among the clients. That is, in the foregoing exemplary embodiments, the proxy clients directly exchange data.

However, data exchange among the proxy clients may be performed directly, but also may be relayed by an additional relay server (not shown). The relay server relays data/information among the proxy clients, and performs a different function from the foregoing server 300.

For example, direct data exchange between the two proxy clients may not be available due to the effect of various network environments. In this case, the two proxy clients may exchange data via the relay server.

As above, the private network according to the present exemplary embodiment may be implemented as various types.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic apparatus connected to a first unit network comprising a plurality of first apparatuses operable to perform direct communication among the plurality of first apparatuses, the electronic apparatus comprising:
   a communication unit configured to connect to a second unit network comprising a plurality of second apparatuses; and
   a controller configured to:
      control the communication unit to transmit and receive data to and from the first apparatuses directly and operate in one of a first mode in which the communication unit transmits and receives data to and from the second unit network without at least one of the first apparatuses therebetween and a second mode in which the communication unit transmits and receives data to and from the second unit network with the at least one of the first apparatuses therebetween, and
      control the communication unit to operate in the first mode in response to at least one of determining that there is no available first apparatuses operating in the first mode is between the electronic apparatus and the second unit network, and determining that the data to be transmitted or received needs to be transferred directly.

2. The electronic apparatus according to claim 1, wherein the communication unit is further configured to connect to a server controlling the first apparatuses to maintain direct communication among the apparatuses of the first unit network, and wherein the controller is further configured to control the communication unit to maintain connection with the server while the communication unit is operating in the first mode.

3. The electronic apparatus according to claim 1, wherein a private network service is provided to the electronic apparatus, and wherein the private network service comprises at least one of an operation of transferring data from at least one of the second apparatuses to the electronic apparatus and an operation of transferring data from the electronic apparatus to the at least one of the second apparatuses.

4. The electronic apparatus according to claim 3, wherein the private network service comprises at least one of a private streaming service, a private live casting and a secured chat service.

5. The electronic apparatus according to claim 1, wherein the controller is further configured to control the communication unit to operate in the first mode if it is determined that a communication traffic between the first apparatuses and the second unit network is at a preset level or higher while the communication unit is operating in the second mode.

6. The electronic apparatus according to claim 1, wherein the first unit network comprises the first apparatuses and the electronic apparatus within an available communication range in which the first apparatuses and the electronic apparatus communicate by at least one of an access point, a gateway and a router.

7. The electronic apparatus according to claim 6, wherein the controller is further configured to control the communication unit to operate in the first mode if the electronic apparatus is out of the available communication range of the first unit network so the first apparatuses between the electronic apparatus and the second unit network cannot be connected to the communication unit while the communication unit is operating in the second mode.

8. The electronic apparatus according to claim 7, wherein the controller is further configured to control the communication unit to operate in the second mode again if the electronic apparatus which has been out of the available communication range of the first unit network is within the available communication range again so the first apparatuses between the electronic apparatus and the second unit network can communicate with the communication unit.

9. A network system comprising:
a plurality of apparatuses configured to form a plurality of unit networks; and
a server configured to connect to a plurality of apparatuses to control first apparatuses forming a first unit network to perform direct communication among the plurality of first apparatuses, wherein the first apparatus of a first unit network operates in a first mode to transmit and receive data to and from a second unit network without any apparatus of the first unit network therebetween, and a second apparatus of the first unit network operates in a second mode to transmit and receive data to and from the second unit network with the first apparatus therebetween, and the second apparatus selectively changes an operational mode from the second mode to the first mode in response to at least one of determining that there is no available first apparatus operating in the first mode is between the second apparatus and the second unit network and determining that the data to be transmitted or received needs to be transferred directly.

10. The network system according to claim 9, wherein the first apparatus maintains connection to the server while operating in the first mode and the second client disconnects from the server while operating in the second mode.

11. The network system according to claim 10, wherein the second apparatus reconnects to the server when the operational mode is changed from the second mode to the first mode.

12. The network system according to claim 9, wherein the plurality of apparatuses forming the unit networks are provided private network services between the plurality of apparatuses by directly exchanging data.

13. The network system according to claim 12, wherein the private network service comprises at least one of a private streaming service, a private live casting and a secured chat service.

14. The network system according to claim 9, wherein the second apparatus changes the operational mode to the first mode if it is determined that a communication traffic between the first apparatus and the second unit network is at a preset level or higher while the second apparatus is operating in the second mode.

15. The network system according to claim 9, wherein the first apparatuses of the first unit network are within an available communication range in which the first apparatuses communicate with other first apparatuses by at least one of an access point, a gateway and a router.

16. The network system according to claim 15, wherein the second apparatus changes the operational mode to the first mode if the second apparatus is out of the available communication range of the first unit network so the first apparatus between the second apparatus and the second unit network cannot be connected to the second apparatus while operating in the second mode.

17. The network system according to claim 16, wherein the second apparatus changes the operational mode to the second mode again if the second apparatus which has been out of the available communication range of the first unit network is within the available communication range again so the first apparatus between the second apparatus and the second unit network can be connected to the second apparatus.

18. A method for establishing a private network with a plurality of unit groups comprising a plurality of clients, the method comprising:
selecting a proxy client from a first unit group comprising a plurality of first clients to operate in a proxy mode to communicate with a second unit group without any client of the first unit group therebetween;
classifying the other clients of the first unit group as node clients which communicate with the second unit group with the proxy client therebetween; and
changing an operational mode of the node clients from a node mode to the proxy mode in response to at least one of determining that there is no available proxy client operating in the proxy mode between the node client and the second unit network, and determining that the data to be transmitted or received needs to be transferred directly.

* * * * *